(12) United States Patent
Chin et al.

(10) Patent No.: US 7,710,524 B2
(45) Date of Patent: May 4, 2010

(54) LIQUID CRYSTAL DISPLAY WITH COMPENSATED PIXEL ARRAYS

(75) Inventors: Chun-Chang Chin, Bade (TW); Hsu-Cheng Yeh, Lujhu Township, Taoyuan County (TW)

(73) Assignee: Quanta Display, Inc., Hsin-Chu (TW)

( * ) Notice: Subject to any disclaimer, the term of this patent is extended or adjusted under 35 U.S.C. 154(b) by 489 days.

(21) Appl. No.: 11/644,353

(22) Filed: Dec. 21, 2006

(65) Prior Publication Data

US 2007/0216844 A1 Sep. 20, 2007

Related U.S. Application Data

(60) Provisional application No. 60/782,885, filed on Mar. 15, 2006.

(51) Int. Cl.
  *G02F 1/1337* (2006.01)
  *G02F 1/1333* (2006.01)
  *G02F 1/1343* (2006.01)
(52) U.S. Cl. .................. 349/129; 349/85; 349/123; 349/144
(58) Field of Classification Search .................. None
  See application file for complete search history.

(56) References Cited

U.S. PATENT DOCUMENTS

| | | | |
|---|---|---|---|
| 5,253,797 A | 10/1993 | Ferrando et al. | |
| 6,158,576 A | 12/2000 | Eagles et al. | |
| 2004/0145552 A1* | 7/2004 | Song et al. | 345/87 |
| 2004/0252249 A1* | 12/2004 | Hong | 349/37 |
| 2004/0257486 A1* | 12/2004 | Tai et al. | 349/42 |
| 2005/0253797 A1 | 11/2005 | Kamada et al. | |
| 2006/0139536 A1* | 6/2006 | Jones | 349/123 |
| 2006/0203166 A1* | 9/2006 | Inoue et al. | 349/129 |

FOREIGN PATENT DOCUMENTS

CN  1694152 A  11/2005
JP  2005-134642  5/2005

OTHER PUBLICATIONS

Sunata, T., et al., "A Wide-Viewing-Angle 10-inch-Diagonal Full-Color Active-Matrix LCD Using a Halftone-Grayscale Method", CH-3071-8/91/0000-0255 1991 IEEE.

* cited by examiner

*Primary Examiner*—Tina M Wong
(74) *Attorney, Agent, or Firm*—K&L Gates LLP

(57) ABSTRACT

A liquid crystal display having one or more pixels, each of which includes a first sub-pixel operating at a first threshold voltage, and a second sub-pixel neighboring the first sub-pixel, and operating at a second threshold voltage. The first sub-pixel is divided into two separate portions by the second sub-pixel to form at least four domains of liquid crystal molecules illuminating at various gray levels for improving viewing angle characteristics of the liquid crystal display.

18 Claims, 5 Drawing Sheets

LIQUID CRYSTAL DISPLAY WITH COMPENSATED PIXEL ARRAYS

CROSS REFERENCE

The present application claims the benefits of U.S. Provisional Patent Application Ser. No. 60/782,885, which was filed on Mar. 15, 2006 and entitled "LIQUID CRYSTAL DISPLAY DEVICE."

BACKGROUND

The present invention relates to a liquid crystal display, and more particularly to a liquid crystal display with compensated pixel arrays.

A liquid crystal display is a thin and flat display device comprised of a number of pixels arrayed in front of a light source or reflector. Each pixel contains a layer of liquid crystal molecules between two electrodes. The liquid crystal molecules have electric charges on them. Applying biases to the electrodes creates electrostatic forces that twist the molecules. This twists the light passing through the molecules, and allows varying degrees of light to pass (or not to pass) through the filters. An image can therefore be displayed by those rows and columns of pixels.

FIG. 1 illustrates a conventional pixel array 100, in which each pixel 102 is formed by a first sub-pixel 104 and a second sub-pixel 106 divided by a slit 120 therebetween. In order to improve viewing angle characteristics, the first and second sub-pixels 104 and 106 are designed with different threshold voltages, such that the two sub-pixels 104 and 106 would be charged at different saturation voltage levels when they illuminate. The different saturation voltage levels of the two sub pixels 104 and 106 cause the liquid crystal molecules therein to have different orientation directions. Thus, this improves the viewing angle characteristics.

In order to further improve the viewing angle characteristics, each sub-pixel 104 is divided into a number of domains, in which the liquid crystal molecules have various orientation directions. For example, the sub-pixel 104 is divided by protrusions 108 and 110 into three portions. Due to the geometry of the three portions, the molecules of the upper-left portion have an orientation direction represented by an arrow 112, the molecules of the lower-left portion have an orientation direction represented by an arrow 114, and the molecules of the right portion have one orientation direction represented by an arrow 116 for its upper half and another orientation direction represented by an arrow 118 for its lower half. Each portion of an orientation direction defines a domain. Thus, the sub-pixel 102 has four domains.

These various domains improve the viewing angle characteristics. FIG. 2 illustrates a cross-sectional view 200 of the sub-pixel 104 along line A-A. When the electrodes 202 and 204 are charged, the protrusion 108 causes the molecules at the right to orient along one direction, and the molecules at the left to orient along another direction. This allows the top position 206, upper-right position 208, and upper left position 210 to receive the same amount of light. In other words, the sub-pixel 104 can be viewed from various angles with relatively uniform light transmittance.

One drawback of the conventional pixel array 100 is that the protrusions and slits reduce its aperture ratio, which refers to the ratio between the area of a pixel that can transmit light and the actual area of the pixel. It is understood by people skilled in the art that more protrusions and slits lead to a lower aperture ratio. As shown in FIG. 1, the sub-pixels 104 and 106 are divided by a slit 120, and each of them includes two protrusions. This reduces the aperture ratio of the pixel 102.

FIG. 3 illustrates another conventional pixel array 300, in which each pixel 302 is formed by a first sub-pixel 304 of a lower threshold voltage and a second sub-pixel 306 of a higher threshold voltage. As shown in the drawing, each sub-pixel 304 or 306 only has one protrusion. Thus, the aperture ratio of the pixel 302 is improved.

One drawback of the conventional pixel array 300 is that its pixel arrangement is often susceptible to the "mura" issue, which refers to the non-uniformity of an image over a large area of pixels. Referring to FIGS. 3 and 4 simultaneously, when viewing from the right side of the conventional pixel array 300, certain rows of sub-pixels 402 would appear to be darker because of their molecule orientations. The sub-pixel 306 has a higher threshold voltage, so that it appears to be darker when it illuminates. The sub-pixel 304 has a lower threshold voltage, so that it appears to be brighter when it illuminates. As a result, columns 404 would appear to be darker because they are formed by the high threshold voltage sub-pixels 306, while columns 406 would appear to be brighter because they are formed by low threshold voltage sub-pixels 304. This causes bright and dark stripes interwoven with each other, which is the "mura" defect.

As such, what is needed is a liquid crystal display with a pixel array that provides a high aperture ratio, while being free from the "mura" defect.

SUMMARY

The present invention discloses a liquid crystal display having one or more pixels. In one embodiment of the present invention, each pixel includes a first sub-pixel operating at a first threshold voltage, and a second sub-pixel neighboring the first sub-pixel, and operating at a second threshold voltage. The first sub-pixel is divided into two separate portions by the second sub-pixel to form at least four domains of liquid crystal molecules illuminating at various gray levels for improving viewing angle characteristics of the liquid crystal display.

The construction and method of operation of the invention, however, together with additional objectives and advantages thereof will be best understood from the following description of specific embodiments when read in connection with the accompanying drawings.

DESCRIPTION

Figure 1:
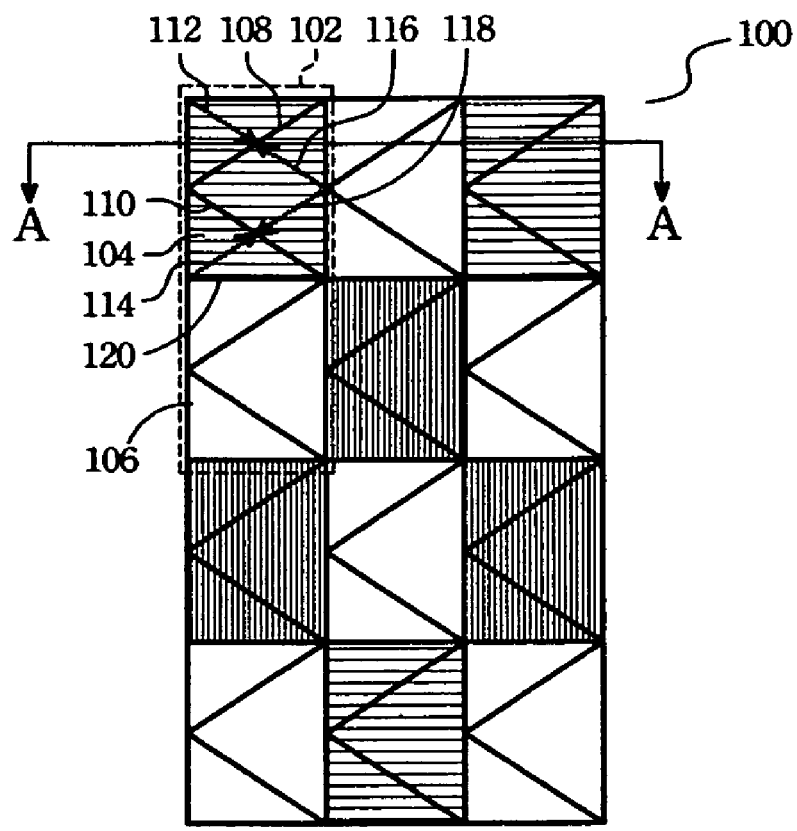
FIG. 1 illustrates a conventional pixel array of a liquid crystal display.
Figure 2:
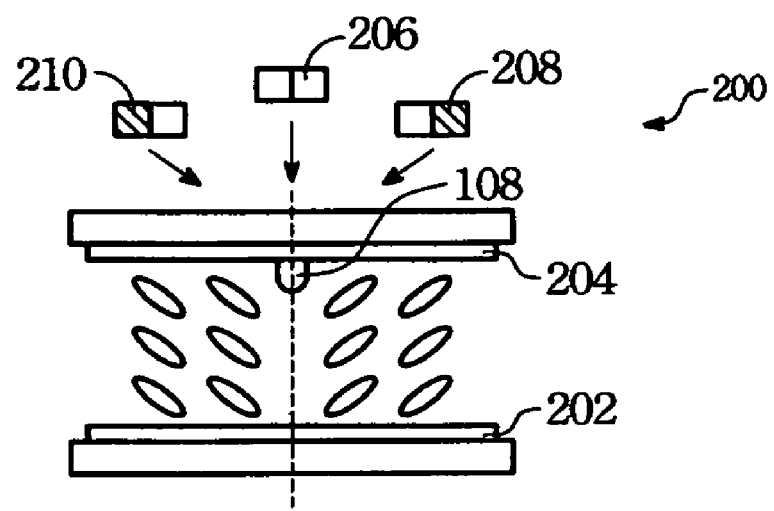
FIG. 2 illustrates a cross-sectional view of the conventional pixel.
Figure 3:
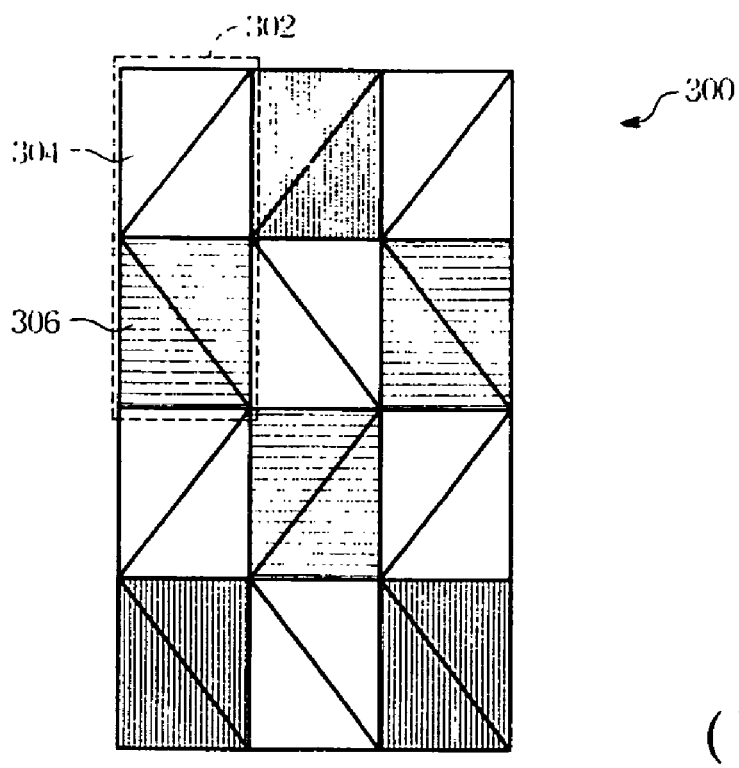
FIG. 3 illustrates another conventional pixel array of a liquid crystal display.
Figure 5:
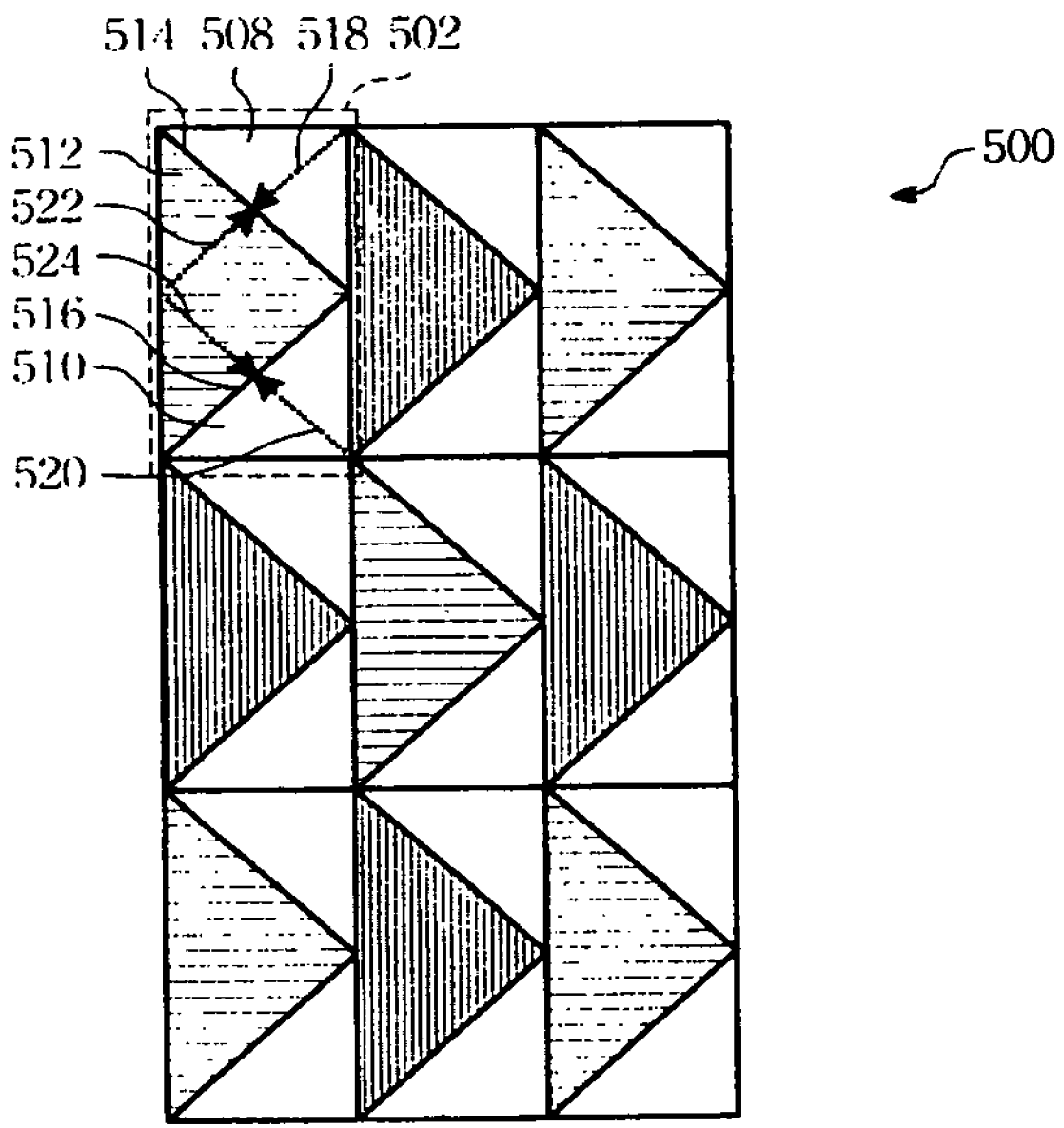
FIG. 5 illustrates a pixel array in accordance with one embodiment of the present invention.

FIG. 5 illustrates a pixel array 500 in accordance with one embodiment of the present invention. The pixel array 500 can be used in various modes of liquid crystal displays, such as the vertically-aligned (VA) mode LCD devices and the twisted-nematic (TN) mode LCD devices. The pixel array 500 is comprised of a plurality of pixels in a rectangular shape where each pixel is divided into two sub-pixels. Each pixel is further divided into a number of domains where the crystal molecules are oriented along different directions. For example, the pixel 502 is divided into three portions 508, 510 and 512 by slits 514 and 516, wherein the slit 514 extends from a mid-point of one side of the pixel 502 to a corner of an opposite side of the pixel 502, and the slit 516 extends from the mid-point of one side of the pixel to another corner of the opposite side of the pixel 502. The portions 508 and 510 are electrically connected to each other, whereas the portion 512 is electrically disconnected from the other portions 508 and 510. Thus, the portions 508 and 510 form a first sub-pixel, and the portion 512 forms a second sub-pixel. The liquid crystal molecules of the portion 508 are oriented along a direction represented by an arrow 518, and the liquid crystal molecules of the portion 510 are oriented along a direction represented by an arrow 520. Due to the geometry of the slits 514 and 516, the liquid crystal molecules of the upper half of the portion 512 are oriented along a direction represented by an arrow 522, and the liquid crystal molecules of the lower half of the portion 512 are oriented along a direction represented by an arrow 524. The area where the liquid crystal molecules have the same orientation direction is defined as a domain. Thus, the pixel 502 has four domains. These domains improve the viewing angle characteristics for the pixel 502. Further, the pixel 502 has only two slits 514 and 516. Compared to the conventional pixel 102 of FIG. 1 that has four protrusions and one slit, the aperture ratio of the pixel 502 is significantly improved.

The portions 508 and 510 are designed to have a lower threshold voltage, and the portion 512 is designed to have a higher threshold voltage. Such arrangement of the high and low threshold voltage portions is repeated for all the pixels in the pixel array 500. As shown in FIG. 5, the shaded areas represent the high threshold portions, and the un-shaded areas represent the low threshold portions. The pixels with areas shaded by horizontal lines are charged by a positive polarity, and the pixels with areas shaded by vertical lines are charged by a negative polarity. The polarity of the charges may be switched in order to extend the life spans of the pixels. Due to the difference of the polarity, the positively charged pixels and the negatively charged pixels may have slightly different gray levels.

Figure 4:
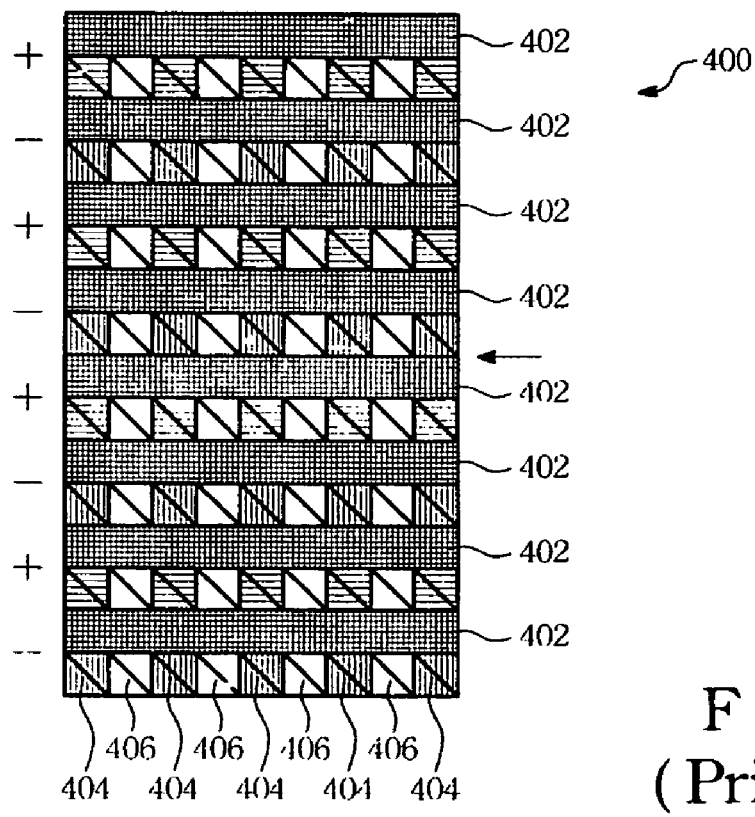
FIG. 4 illustrates the conventional pixel array having the "mura" defect when viewing from a certain angle.
Figure 6:
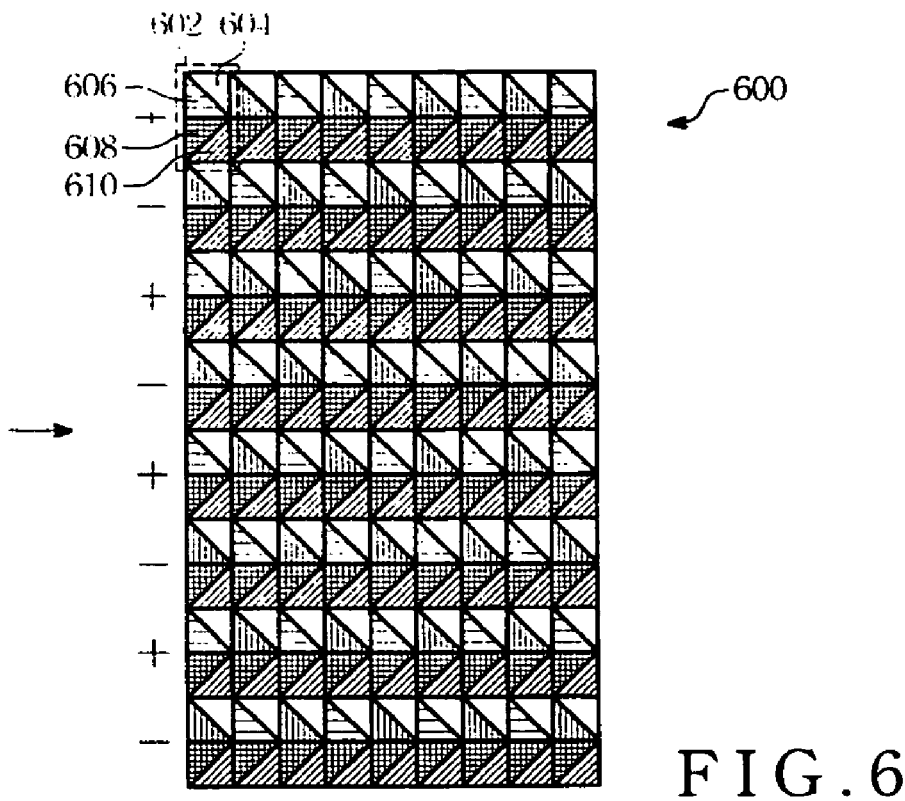
FIG. 6 illustrates the pixel array when viewing from a first direction in accordance with the embodiment of the present invention.

FIG. 6 illustrates the pixel array of FIG. 5 when viewing from its left side. For each pixel 602, due to the orientations of the liquid crystal molecules, the upper domains 604 and 606 appear to be brighter than the lower domains 608 and 610. Since the domains 604 and 610 are disposed in the first sub-pixel, and the domains 606 and 608 are disposed in the second sub-pixel, which are driven by different voltages, the domain 604 has a lower threshold voltage, it is brighter than the domain 606. Likewise, since the domain 610 has a lower threshold voltage, it is brighter than the domain 608. As such, each pixel has four domains of various gray levels. The un-shaded areas represent the brightest domains. The areas shaded with horizontal or vertical lines represent the mid-bright domains. The areas shaded with checker patterns represent the darkest domains. The areas shaded with slashes represent the mid-dark domains. As shown in FIG. 6, the brightest, mid-bright, mid-dark, and darkest domains are mixed over the whole pixel array 600. Thus, the pixel array 600 would not have the interwoven bright and dark stripes as shown in FIG. 4. As a result, the "mura" phenomenon is eliminated.

Figure 7:
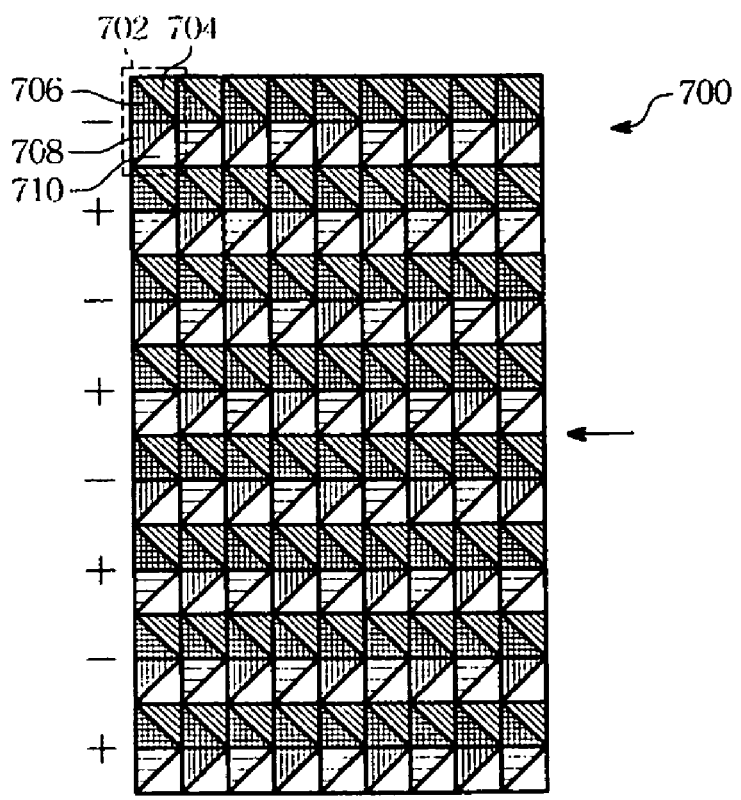
FIG. 7 illustrates the pixel array when viewing from a second direction in accordance with the embodiment of the present invention.

FIG. 7 illustrates the pixel array of FIG. 5 when viewing from its right side. For each pixel 702, due to the orientations of the liquid crystal molecules, the upper domains 704 and 706 appear to be darker than the lower domains 708 and 710. Since the domains 704 and 710 are disposed in the first sub-pixel, and the domains 706 and 708 are disposed in the second sub-pixel, which are driven by different voltages, the domain 704 has a lower threshold voltage, it is brighter than the domain 706. Likewise, since the domain 710 has a lower threshold voltage, it is brighter than the domain 708. As such, each pixel has four domains of various gray levels. More specifically, the un-shaded areas represent the brightest domains. The areas shaded with horizontal or vertical lines represent the mid-bright domains. The areas shaded with checker patterns represent the darkest domains. The areas shaded with slashes represent the mid-dark domains. As shown in FIG. 7, the brightest, mid-bright, mid-dark, and darkest domains are mixed over the whole pixel array 700. Thus, the pixel array 700 would not have the interwoven bright and dark stripes as shown in FIG. 4. As a result, the "mura" phenomenon is eliminated.

Figure 8:
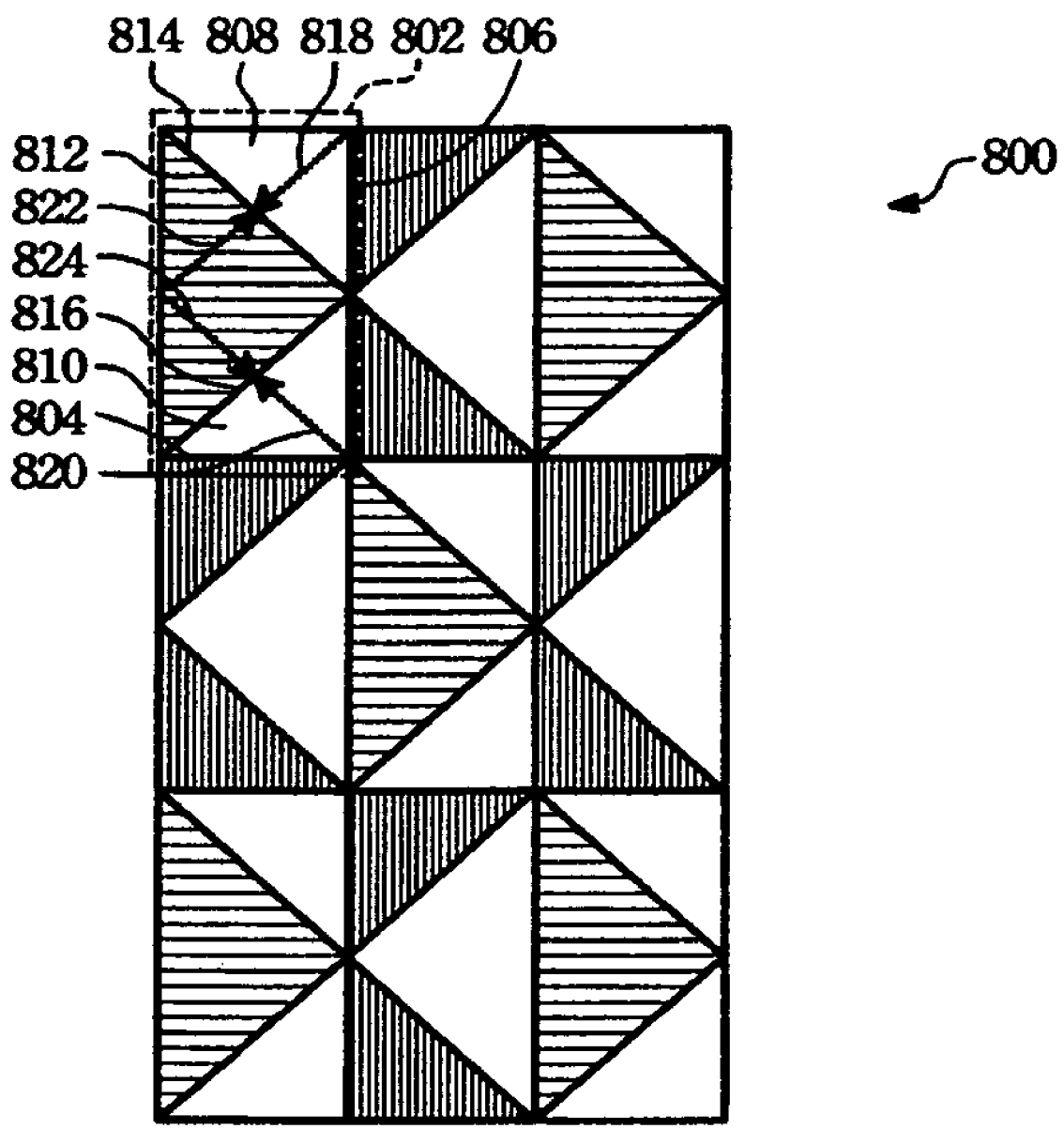
FIG. 8 illustrates another pixel array in accordance with another embodiment of the present invention.

FIG. 8 illustrates a pixel array 800 in accordance with another embodiment of the present invention. The pixel array 800 is comprised of a plurality of pixels in a rectangular shape where each pixel is divided into two sub-pixels. Each pixel is further divided into a number of domains where the crystal molecules are oriented along different directions. For example, the pixel 802 is divided into three portions 808, 810 and 812 by slits 14 and 816, wherein the slit 814 extends from a mid-point of one side of the pixel 802 to a corner of an opposite side of the pixel 802, and the slit 816 extends from the mid-point of one side of the pixel to another corner of the opposite side of the pixel 802. The portions 808 and 810 are electrically connected to each other, whereas the portion 812 is electrically disconnected from the other portions 808 and 810. Thus, the portions 808 and 810 form a first sub-pixel, and the portion 812 forms a second sub-pixel. The liquid crystal molecules of the portion 808 are oriented along a direction represented by an arrow 818, and the liquid crystal molecules of the portion 810 are oriented along a direction represented by an arrow 820. Due to the geometry of the slits 814 and 816, the liquid crystal molecules of the upper half of the portion 812 are oriented along a direction represented by an arrow 822, and the liquid crystal molecules of the lower half of the portion 812 are oriented along a direction represented by an arrow 824. The area where the liquid crystal molecules have the same orientation direction is defined as a domain. Thus, the pixel 802 has four domains. These domains improve the viewing angle characteristics for the pixel 802. Further, the pixel 802 has only two slits 814 and 816. Compared to the conventional pixel 102 of FIG. 1 that has four protrusions and one slit, the aperture ratio of the pixel 802 is significantly improved.

The portions 808 and 810 are designed to have a lower threshold voltage, and the portion 812 is designed to have a higher threshold voltage. Such arrangement of the high and low threshold voltage portions is repeated for all the pixels in the pixel array 800. As shown in FIG. 8, the shaded areas represent the high threshold portions, and the un-shaded areas represent the low threshold portions. The pixels with areas shaded by horizontal lines are charged by a positive polarity, and the pixels with areas shaded by vertical lines are charged by a negative polarity. The polarity of the charges may be switched in order to extend the life spans of the pixels. Due to the difference of polarity, the positively charged pixels and the negatively charged pixels may have slightly different gray levels.

The pixel array 800 of FIG. 8 differs from the pixel array 500 of FIG. 5 in that the arrangement of the high threshold portions and the low threshold portions are reversed for every two neighboring pixels. The pixel array 800 is similar to the pixel array 500 in the sense that when the pixel array 800 is viewed from a certain angle, each pixel will have four domains of various gray levels. As such, the pixel array 800 will not have the interwoven bright and dark stripes as shown in FIG. 4, and therefore, the "mura" phenomenon is eliminated.

It is noted that the above embodiments are mere examples for purposes of description. Any alternative of the embodiments capable of eliminating the "mura" defect without reducing the aperture ratio is within the spirit of the invention. For example, the slits discussed above can be curves instead of straight lines. As another example, the locations of the high threshold and low threshold portions can be switched.

The above illustration provides many different embodiments or embodiments for implementing different features of the invention. Specific embodiments of components and processes are described to help clarify the invention. These are, of course, merely embodiments and are not intended to limit the invention from that described in the claims.

Although the invention is illustrated and described herein as embodied in one or more specific examples, it is nevertheless not intended to be limited to the details shown, since various modifications and structural changes may be made therein without departing from the spirit of the invention and within the scope and range of equivalents of the claims. Accordingly, it is appropriate that the appended claims be construed broadly and in a manner consistent with the scope of the invention, as set forth in the following claims.

What is claimed is:

1. A liquid crystal display having a plurality of pixels comprising:
   a first pixel including a first and a second sub-pixel, the first sub-pixel having a first threshold voltage, the second sub-pixel having a second threshold voltage, the second threshold voltage being different from the first threshold voltage, the second sub-pixel dividing the first sub-pixel into a first and a second portion; and
   a second pixel juxtaposing the first pixel, the second pixel including a third and a fourth sub-pixel, the third sub-pixel having the first threshold voltage, a fourth sub-pixel having the second threshold voltage, the fourth sub-pixel dividing the third sub-pixel into a third and a fourth portion, the second sub-pixel juxtaposing the third sub-pixel.

2. The liquid crystal display of claim 1, wherein the first and the second portion of the first sub-pixel are physically separated but electrically connected.

3. The liquid crystal display of claim 1 wherein both the first and the second pixels have an identical rectangular shape.

4. The liquid crystal display of claim 3, wherein the first pixel comprises a first and a second slit, the first slit extending from a mid-point of one side of the first pixel to a corner of an opposite side of the first pixel and separating the first sub-pixel from the second sub-pixel, and the second slit extending from the mid-point to another corner of the opposite side of the first pixel and separating the first sub-pixel from the second sub-pixel.

5. The liquid crystal display of claim 4, wherein the first and the second slits are straight lines.

6. The liquid crystal display of claim 4, wherein the first and second slits are curved lines.

7. A liquid crystal display having a plurality of pixels comprising:
   a first pixel including a first and a second sub-pixel, the first sub-pixel having a first threshold voltage, the second sub-pixel having a second threshold voltage, the second threshold voltage being different from the first threshold voltage, the second sub-pixel dividing the first sub-pixel into a first and a second portion; and
   a second pixel juxtaposing the first pixel, the second pixel including a third and a fourth sub-pixel, the third sub-pixel having the first threshold voltage, a fourth sub-pixel having the second threshold voltage, the third sub-pixel dividing the fourth sub-pixel into a third and a fourth portion, the second sub-pixel juxtaposing the third sub-pixel.

8. The liquid crystal display of claim 7, wherein the first and the second portion of the first sub-pixel are physically separated but electrically connected.

9. The liquid crystal display of claim 7 wherein both the first and the second pixels have an identical rectangular shape.

10. The liquid crystal display of claim 9, wherein the first pixel comprises a first and a second slit, the first slit extending from a mid-point of one side of the first pixel to a corner of an opposite side of the first pixel and separating the first sub-pixel from the second sub-pixel, and the second slit extending from the mid-point to another corner of the opposite side of the first pixel and separating the first sub-pixel from the second sub-pixel.

11. The liquid crystal display of claim 10, wherein the first and the second slits are straight lines.

12. The liquid crystal display of claim 10, wherein the first and the second slits are curved lines.

13. A liquid crystal display having a plurality of pixels comprising:
   a first pixel including a first and a second slit, the first slit extending from a first mid-point of one side of the first pixel to a corner of an opposite side of the first pixel and dividing the first pixel into a first sub-pixel and a second sub-pixel, the second slit extending from the first mid-point to another corner of the opposite side of the first pixel dividing a portion of the first pixel between the first and the second slit into the second sub-pixel, and the rest area of the first pixel being the first sub-pixel, the first sub-pixel having a first threshold voltage, the second sub-pixel having a second threshold voltage, the second threshold voltage being different from the first threshold voltage; and
   a second pixel juxtaposing the first pixel, the second pixel including a third and a fourth slit, the third slit extending from a second mid-point of one side of the second pixel to a corner of an opposite side of the second pixel and dividing the second pixel into a third sub-pixel and a fourth sub-pixel, the fourth slit extending from the second mid-point to another corner of the opposite side of the second pixel dividing a portion of the second pixel between the third and the fourth slit into the third sub-pixel, and the rest area of the second pixel being the fourth sub-pixel, the third sub-pixel having the first threshold voltage, the fourth sub-pixel having the second threshold voltage, the second mid-point of the second pixel juxtaposing the first mid-point of the first pixel.

14. The liquid crystal display of claim 13, wherein the first sub-pixel includes a first and a second area separated by the first and the second slit, the first and the second area are electrically connected.

15. The liquid crystal display of claim 13, wherein the fourth sub-pixel includes a third and a fourth area separated by the third and the fourth slit, the third and the fourth area are electrically connected.

16. The liquid crystal display of claim 13, wherein both the first and the second pixels have an identical rectangular shape.

17. The liquid crystal display of claim 13, wherein the first and the second slits are straight lines.

18. The liquid crystal display of claim 13, wherein the first and the second slits are curved lines.

* * * * *